United States Patent [19]

Herzog et al.

[11] Patent Number: 5,068,972
[45] Date of Patent: Dec. 3, 1991

[54] COORDINATE-MEASURING MACHINE

[75] Inventors: Klaus Herzog, Oberkochen; Karl-Hermann Breyer, Heidenheim, both of Fed. Rep. of Germany

[73] Assignee: Carl-Zeiss, Oberkochen, Fed. Rep. of Germany

[21] Appl. No.: 604,620

[22] Filed: Oct. 26, 1990

[30] Foreign Application Priority Data

Nov. 2, 1989 [DE] Fed. Rep. of Germany ....... 3936463

[51] Int. Cl.[5] .............................................. G01B 5/03
[52] U.S. Cl. ...................................... 33/503; 33/549; 33/568; 33/1 M
[58] Field of Search ................. 33/503, 504, 555, 556, 33/549, 568, 573, 1 M

[56] References Cited

U.S. PATENT DOCUMENTS

| 3,750,295 | 8/1973 | Nordmann et al. | 33/503 |
| 3,918,167 | 11/1975 | Gerber | 33/503 |
| 4,631,834 | 12/1986 | Hayashi et al. | 33/503 |
| 4,882,847 | 11/1989 | Hemmelgarn et al. | 33/1 M |
| 4,997,274 | 3/1991 | Takakusagi | 33/503 |
| 5,031,331 | 7/1991 | Herzog et al. | 33/1 M |

FOREIGN PATENT DOCUMENTS

2600764 12/1987 France ................................. 33/503

Primary Examiner—Allan N. Shoap
Assistant Examiner—Alvin Wirthlin
Attorney, Agent, or Firm—Hopgood, Calimafde, Kalil, Blaustein & Judlowe

[57] ABSTRACT

The measurement volume A of a given coordinate-measuring machine is increased by a device which consists (i) of a support plate (15) which can be displaced on the surface of the machine table (1) into at least two defined positions and (ii) of a device (16a-c, 17a-c) for measuring the position of the support plate in these different positions. The workpiece to be measured is clamped on said support plate (15) and can then be measured, section by section.

24 Claims, 5 Drawing Sheets

COORDINATE-MEASURING MACHINE

BACKGROUND OF THE INVENTION

The present invention relates to a coordinate-measuring machine having a table to receive a workpiece to be measured and a device which expands the usable measurement volume of the coordinate-measuring machine.

In coordinate-measuring machines, the area of a granite plate forms the machine bed and also serves as the table for receiving a workpiece to be measured, and this granite area is substantially larger than the usable measurement range of the machine in the horizontal plane, i.e., in the direction of the X and Y axes. In a portal-type machine, this is due, among other things, to the fact that a fraction of the surface area of this granite plate must also serve directly as a guide surface, for the displaceable portal; this fraction of the surface area must therefore remain free of obstruction.

In the direction of travel of the portal, the guide surface must always be longer than the travel path, namely, by at least the base length of the guided base regions of the portal columns. For reasons of stability, this base length is greater, the greater the height of the portal. The guided base regions of the portal columns require spaced travel paths along relatively wide lateral margins of the granite plate; these lateral margins of the granite plate must be outside the measurement volume of the machine and cannot be used either for workpiece-clamping or for mounting a probe-exchange device. These considerations are factors making the machine more expensive as well as unnecessarily large and heavy.

It has already been proposed to expand the measurement range of a coordinate-measuring machine of the portal type, in the direction perpendicular to the direction of portal travel, by extending the bridge or cross-arm so as to project outwardly on both lateral sides beyond the feet of the portal columns, thereby extending the Y-axis guide, for a cross-slide traveling thereon. Such a machine is described, for example in West German Patent No. 3,024,455.

This measure of laterally outward projection cannot be readily used for increasing the measurement range in the direction of travel of the portal since a lengthening of the guide surface means nothing else but a lengthening of the granite plate. Even if those parts of the table which are outside the guide paths were to be removed, the granite plate would nevertheless have to be produced from a larger block since the guide paths must consist of one piece. Furthermore, a lengthening of the guide paths has the result that the scale for measuring the position of the portal in the direction of travel becomes correspondingly long. And the creation of long scales results in disproportionately high expense once a given maximum length is exceeded.

West German published Application OS 3,729,433 describes a coordinate-measuring machine of the portal type wherein a recess is formed in the granite plate so that workpieces can be measured even if their height exceeds the height of the measurement volume. In use, the upper part of the workpiece which extends out the recess is first measured, and the workpiece is then lifted out by means of a crane, inverted, inserted again into the recess, and then measured with respect to another side. This is a very cumbersome and time-consuming method. The measurement range is not increased by these measures.

West German Patent No. 1,798,191 describes a coordinate-measuring machine which has a table which can be adjusted vertically in several steps. In this machine, the vertical distance between the probe head and the lower position of the table top is relatively large as compared with the measurement range in the direction of the Z axis, i.e., with respect to the range of displacement of the vertical spindle of the machine. Thus, even relatively high workpieces can be measured and for flat workpieces the table is simply displaced upward to a given minimum height. Again, however, the measurement range is not increased by this technique.

West German published Application OS 3,527,384 discloses a one-dimensional length-measuring machine, the measurement slide of which is guided indirectly in a second slide which, in its turn, is guided for displacement in the same direction on a stationary machine table. The scale which measures the position of the probe pin in the direction of displacement is scanned by two pick-up heads, one of the heads being lockable in different positions.

If one wanted to apply these measures to multiple-coordinate measuring machines, then twice the number of highly accurate guides would accordingly have to be provided. In the case of portal-type machines, the portal, which is in any event already very heavy, would then have to be guided on a second displaceable slide. This would be cumbersome and would entail disproportionately high expense.

BRIEF STATEMENT OF THE INVENTION

It is an object of the present invention to provide coordinate-measurement machines with a device which clearly increases the useful measurement volume by the simplest possible means, without increasing the dimensions of the machine or the axial length of the individual guide directions.

The invention achieves this object by providing a coordinate-measuring machine with a support plate which can be displaced on the machine table into at least two defined positions, and means for measuring the position of the support plate in each of these positions.

It is possible by these measures to increase the measurement volume of the machine in one of the measuring axes, which in the case of portal-type machines, is preferably in the direction of travel of the portal. This increase in travel distance corresponds to the displacement range of the support plate. The support plate can, for example, be a workpiece pallet which is supported by air bearings on the table of the coordinate-measurement machine; this support plate can therefore be displaced into the different positions, by hand or by a suitable drive, without involving great force development.

If a drive is provided, it can be set up alongside the table of the coordinate-measuring machine. It is, however, advantageous to install the drive in an upwardly open groove or channel in the table of the machine where the drive cannot interfere with accessibility to the measurement volume of the machine.

In order that measurement points which have been scanned on the workpiece in the different positions of the support plate, can also be rationalized to each other with respect to their coordinate-measurement points, the position of the support plate in the two positions, i.e., before and after a displacement, must be known with the accuracy required for coordinate measurements on the workpiece. This can be assured by fixing several reference bodies (which define measuring points) on the support plate, the reference bodies being so located that they can be contacted by the probe head of the coordinate measuring machine, in each of the different positions of the support plate. It is, however, advantageous if, in addition, several sensors are mounted on the machine table, at locations where these sensors will measure the support plate in the different positions. With such sensors, no measurement time is lost in order to measure the position of the support plate at either of its displaced positions. Instead, the signals of the sensors are simply also taken into account by the computer of the coordinate-measuring machine, as part of its processing to convert (i.e., transpose) measurement points on the workpiece into a common workpiece-coordinate system.

It is also possible to guide the support plate itself in the direction of displacement, as for example by relying for guidance on the above-mentioned groove or channel in the machine table, and to use another scale for measuring the extent of support-plate displacement.

If the support plate is motor-driven, it is particularly advantageous to so select the speed of travel of the portal and of the support plate that the impulse reaction to portal and support displacements are opposite and equal. In this way, tilting of the machine table while driving in the direction of portal travel is completely avoided, and, with such dynamic-mass balancing, high accelerations and speeds of displacement can be realized in the measurement axis of portal displacement.

DETAILED DESCRIPTION

The invention will be described in detail, for each of two embodiments, in conjunction with the accompanying drawings, in which.

Figure 1:
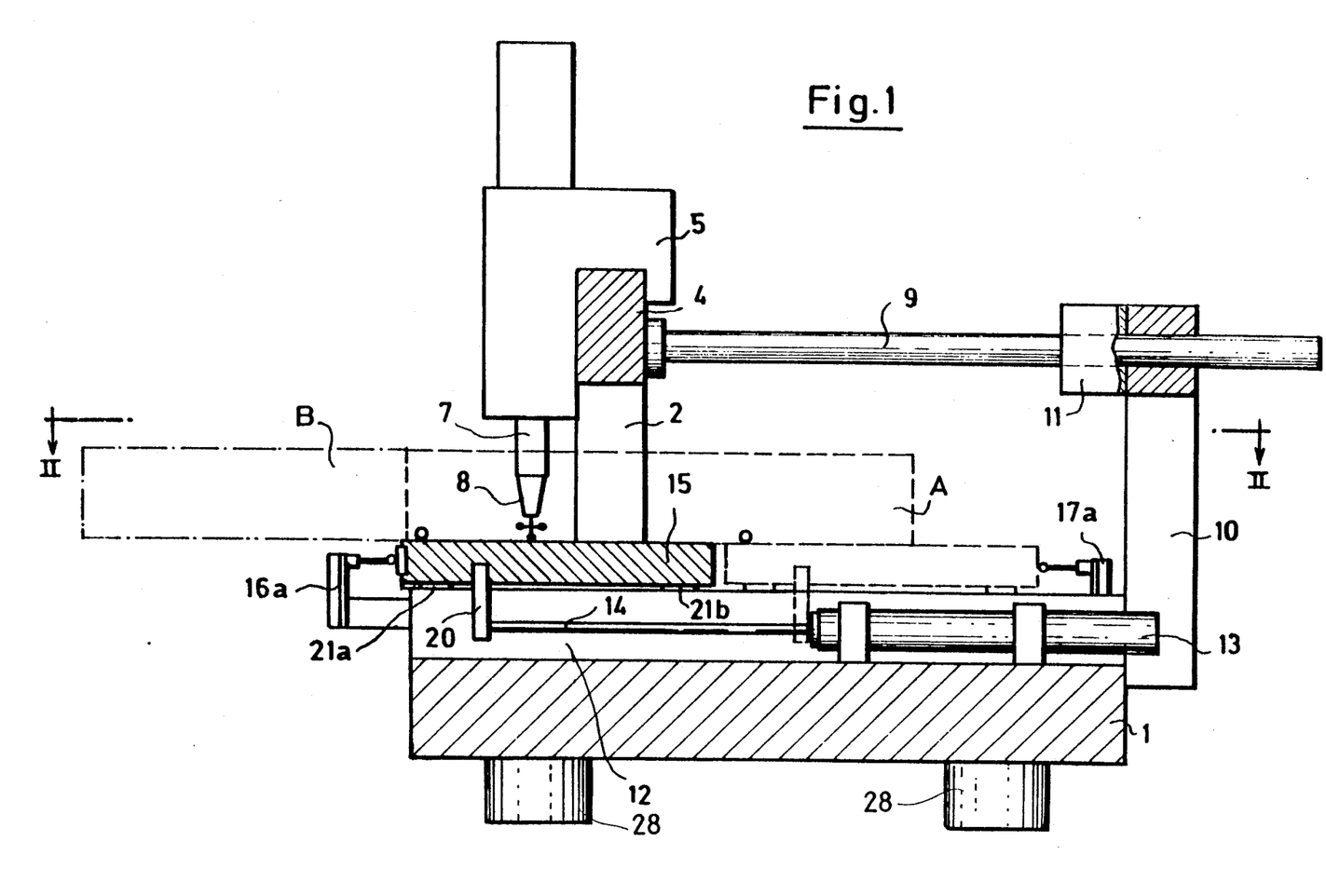
FIG. 1 is a side view in elevation of a coordinate-measuring machine of the portal type having a range-expanding device of the invention, wherein said device is shown in section in a vertical plane.
Figure 2:
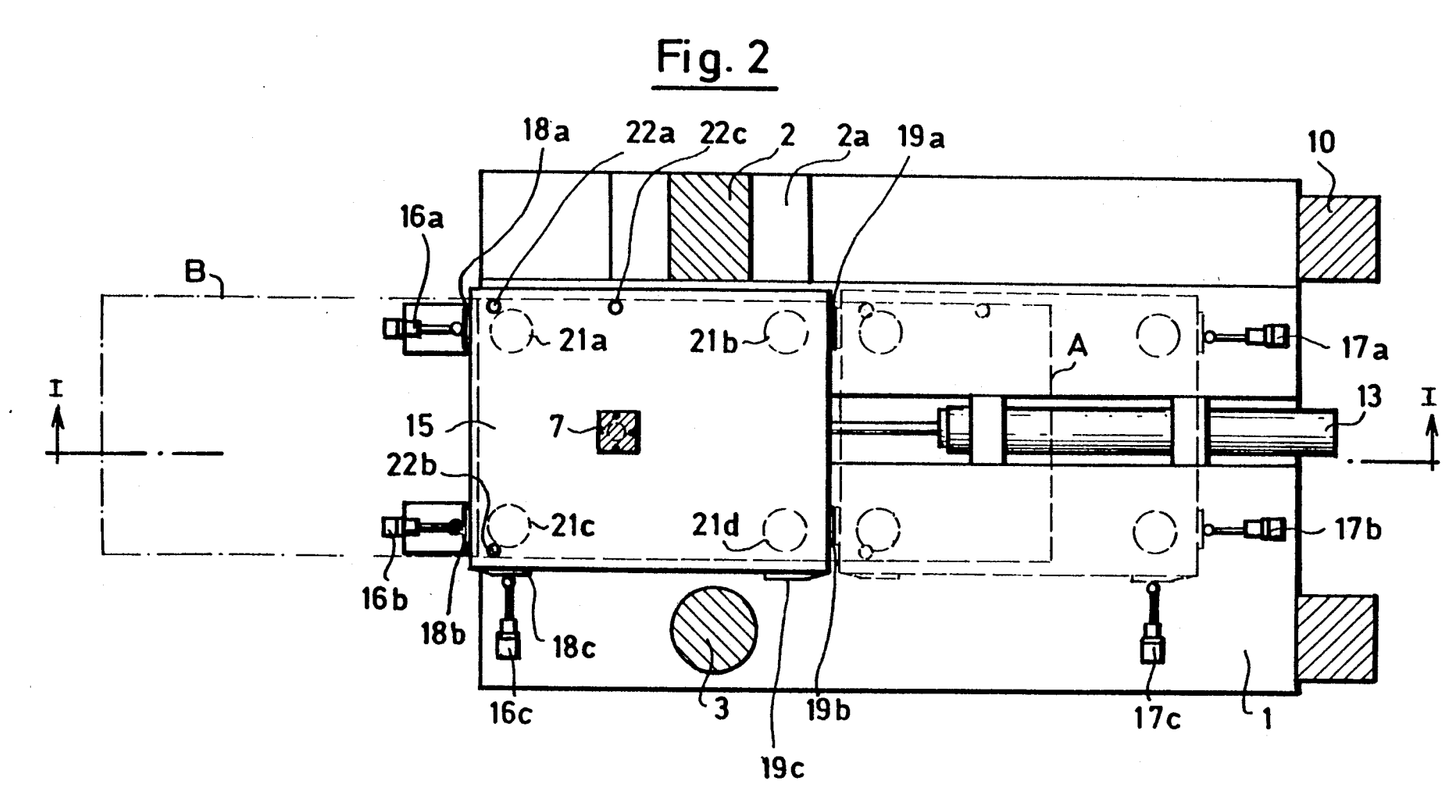
FIG. 2 is a sectional view taken in the horizontal plane of line II—II in FIG. 1, the vertical-section plane of FIG. 1 being indicated at I—I in FIG. 2.

In the coordinate-measuring machine of FIGS. 1 and 2, a stationary granite plate or table 1 provides the base of the machine, being mounted with vibration damping by means 28, not shown in detail. Portal structure comprising two spaced upstanding columns 2, 3 and a connecting bridge member or traverse guide 4 is bodily movable over the surface of this granite table. The portal is displaced by means of an actuating rod 9 connected to the bridge member 4 and to drive means 11 that is mounted to the upper end of stationary portal-like support structure 10. The two upstanding legs of support 10 are attached to the rear-end surface of the granite table 1.

Bridge member 4 establishes a traverse guide for a cross-slide 5 which is displaceable transverse to the direction of travel of the portal. And the cross-slide in turn mounts a vertically movable spindle 7 with an attached probe head 8.

Coordinate-measuring machines having the construction thus-far described are known per se. In the known machines, the surface of the granite plate 1 is at the same time the table on which a workpiece is placed for measurement. The useful measurement volume of such a machine corresponds approximately to the area A, indicated by dashed lines in FIG. 2. The length dimension of this area is considerably shorter than the length of the granite plate 1, namely, by at least the length dimension of the base end 2a of the portal column 2; in FIG. 2, this base end or foot is the guide base for the longitudinal direction of portal displacement.

In accordance with the invention, the following additional measures are now adopted:

Between the spaced parallel areas of the granite plate 1 which serve as guide surfaces in the direction of portal travel, a support plate 15, of width adapted to the inside dimension of the portal, is mounted for displacement in the direction of portal travel. The support plate 15 rests on the granite plate 1 via four air bearings ($21a$–$d$) and can thus be displaced free of friction. A longitudinal groove or channel 12 is milled into the granite plate 1. A pneumatic cylinder 13 is mounted in this channel, and the piston rod 14 of the pneumatic cylinder is connected to act on a lug or bracket 20 attached to the bottom of the support plate 15. This pneumatic drive will be seen to selectively displace and position the support plate 15 in the longitudinal direction, parallel to the direction of portal travel, and into either one of two limiting positions, which are respectively shown in solid and in dashed outlines.

A relatively long workpiece, which even protrudes forward beyond the granite plate 1, can now be measured on the support plate 15 by displacing the support plate 15 successively into one and then the other of its two different positions. The added measurement volume which has been gained by this measure is indicated by dash-dot outline, marked B. The position of the support plate 15 must be measured precisely in each of these two positions so that position coordinates can be taken into account when transforming coordinate-measurement values on the workpiece to a common coordinate system which refers to the entire measurement volume. To this end, three reference points are provided, for example by the centers of three balls ($22a$–$c$), in fixed longitudinally and laterally spaced relation on the surface of the support plate 15; alternatively, these centers can also be derived from other geometric bodies, such as cones, triple-ball clusters, a disc with borehole, etc.

The position of the support plate 15 is always unequivocally determined by the coordinates of the three reference points; thus, after each displacement of plate 15, the position of workpiece features (which have necessarily also moved with plate 15) can be known from a programmed course of the probe contact with the three balls ($22a$–$c$), to determine the three reference points, for computer use in mathematical transposition of workpiece-measured coordinates into the coordinate system of the now-enlarged measurement volume of the machine.

However, in order not to have to measure the position of the support plate 15 after each displacement by means of the coordinate-measuring machine, three spaced sensors in the form of inductive sensors (16a–c) and (17a–c) are provided at each end of the displacement range. These inductive sensors scan corresponding flat surfaces (18a–c) and (19a–c) on the end surfaces and on one side surface of the support plate 15. The signals of these inductance sensors and the position data obtained therefrom are fed to the computer of the coordinate-measuring machine. They are therefore immediately available after each displacement and can be added as correction values to the coordinate-measurement data that are obtained by probe contact with the workpiece, in each of the two displaced positions of plate 15.

The inductive sensors determine the position of the support plate 15 in the plane of the machine table or plate 1. To the extent that changes in position or tilting with respect to this plane may have occurred in the course of displacement of the support plate 15, such deviations can be reproduced since they depend on the shape of the surface of the granite plate 1, which has sufficient long-term stability. It is therefore only necessary to make an initial single determination of the position of the support plate 15, by scanning the three balls (22a–c) in each of the two positions of the support plate. During that initial operation, the inductive sensors (16a–c) and (17a–c) are calibrated at the same time. After each subsequent displacement, the position of the support plate 15 is calculated by the computer of the coordinate-measuring machine, from the calibration data and from the indicated values of the inductive-measurement systems (16a–c) and (17a–c).

The described device serves not only to expand the measurement volume of the measuring machine, but it can also advantageously be used to facilitate loading of the machine; in addition, the described device makes it possible, in computer-controlled probe-changing operations, and within the expanded measuring range of the machine, to use a larger magazine of interchangeable probes which would otherwise be beyond the measuring range of the machine.

Figure 3:
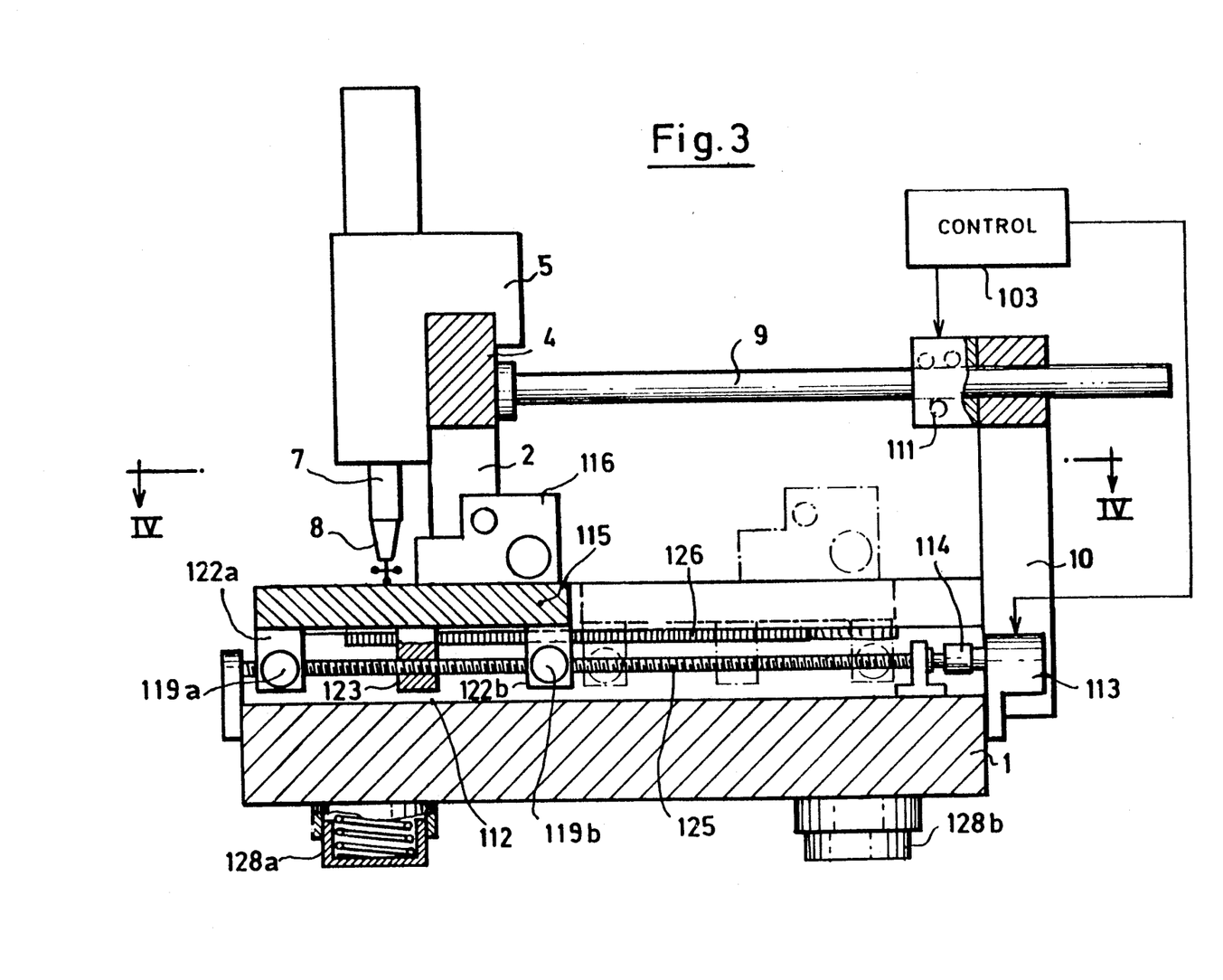
FIG. 3 is a view similar to FIG. 1, to show another embodiment of the invention.
Figure 4:
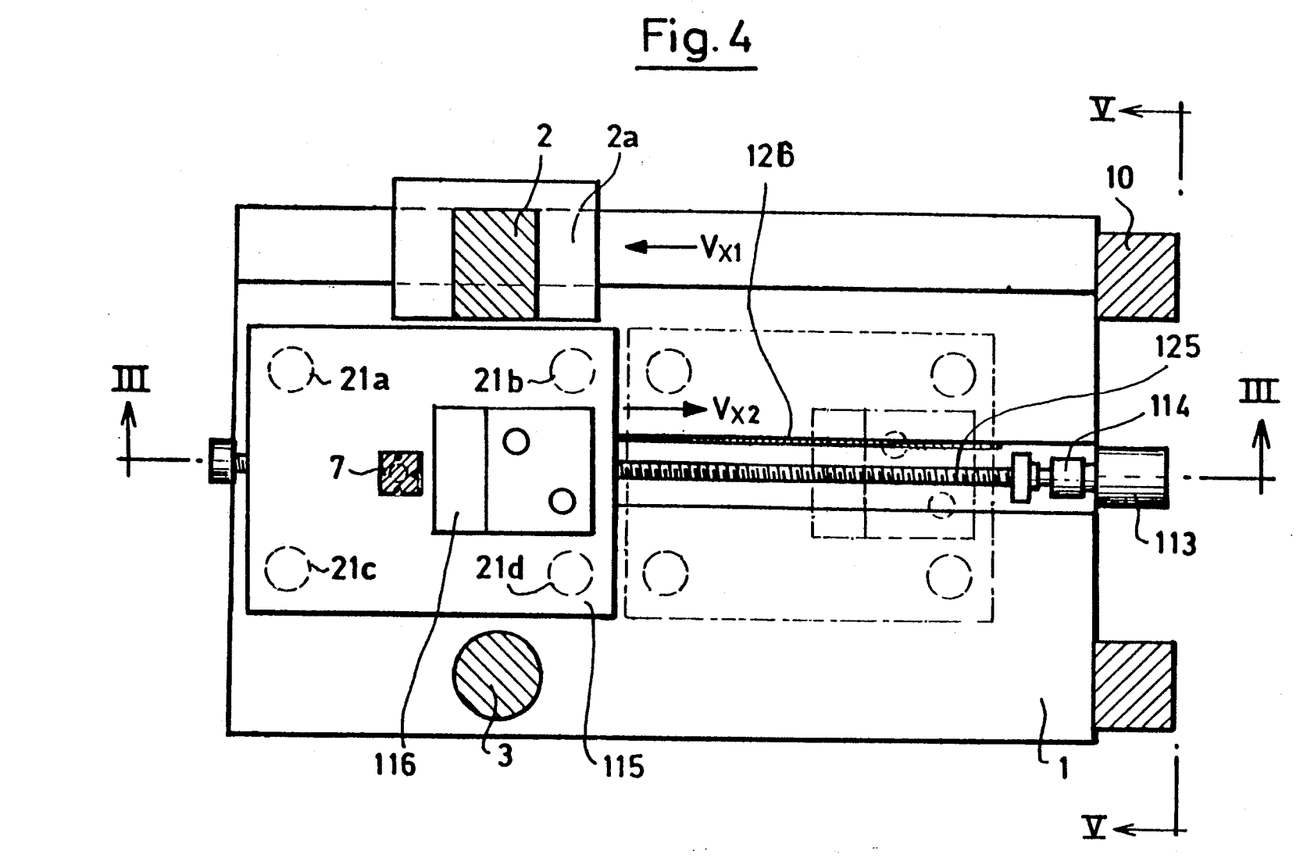
FIG. 4 is a sectional view taken in the horizontal plane of the line IV—IV of FIG. 3, the vertical-section plane of FIG. 3 being indicated at III—III in FIG. 4.
Figure 5:
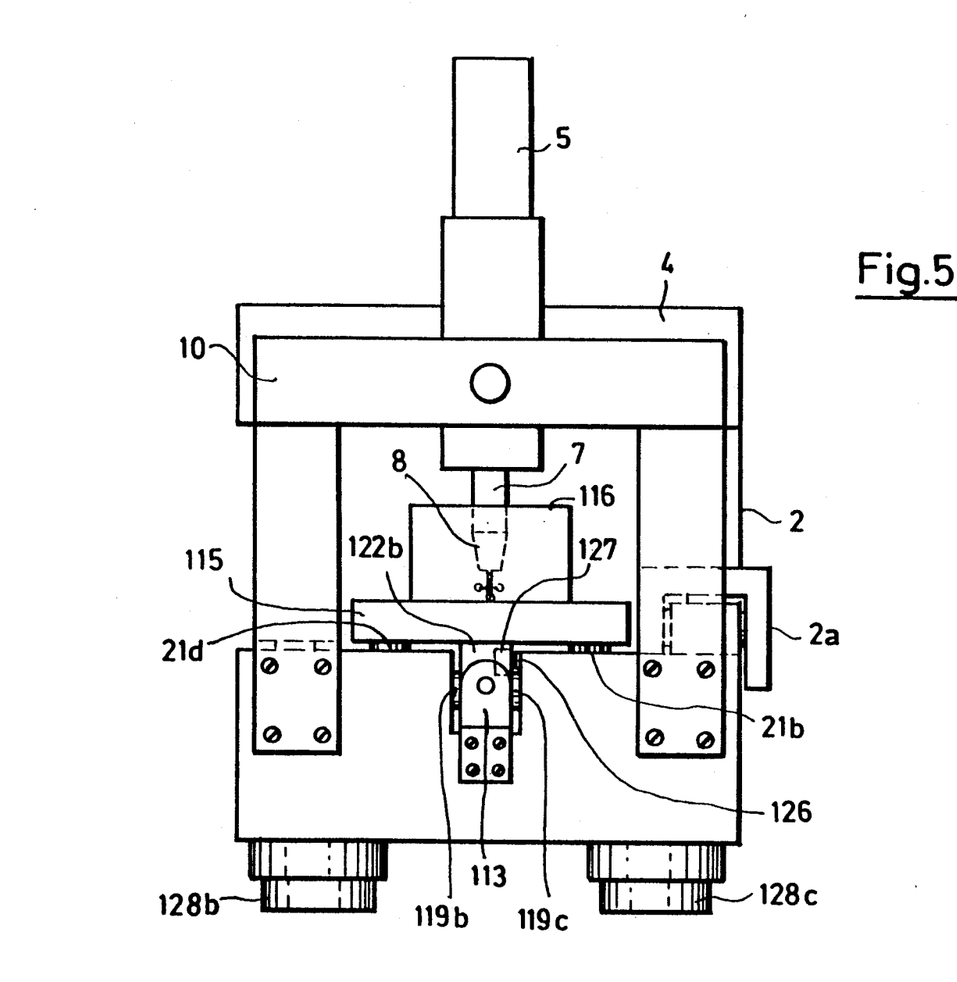
FIG. 5 is a rear elevational view of the machine of FIG. 3, namely, as viewed from the aspect V—V of FIG. 4.

In FIGS. 3 to 5, the second embodiment of the invention is also applied to a coordinate-measuring machine of the portal type. Identical parts have been provided with the same reference numbers as those of the first embodiment (FIGS. 1 and 2) and therefore need not be again described. The machine of FIGS. 3 to 5 differs from that of FIGS. 1 and 2 in the following respects:

A support plate 115 is displaceable in the direction of travel of the portal 2 on the granite plate 1, and plate 115 is reversibly driven by a motor 113, coupled at 114 to a lead screw 125, having threads engaged to a nut 123 that is fixed to plate 115. The support plate 115 is also guided in the direction of displacement by two air bearings (119a/d) and (119b/c) which are clamped in pairs, in back-to-back relation, being connected to the support plate 115 by longitudinally spaced mountings 122a and 122b which are attached centrally to the bottom of the support plate 115 and rest against the inner sides of a guide channel 112; the nature of the section plane at which FIG. 3 is taken, and the nature of the end view of FIG. 5, preclude a showing of air bearing 119d, but its paired opposition to air bearing 119a (analogous to the paired opposition of air bearings 119b and 119c) will be understood. These side areas of channel 112 therefore serve as the guide for the support plate 115 in the direction of portal travel.

Longitudinal displacement of the support plate 115 is measured by means of a scale 126 which is attached at the top margin of one of the sides of channel 112 and is scanned by a reading head 127 that is integrated into the mounting 122b, as schematically shown by dashed lines in FIG. 5.

For the same above-explained situation which precludes a specific showing of air bearing 119d, it will be understood that the nature of the section plane at which FIG. 3 is taken, and the nature of the end view of FIG. 5 preclude a showing of the fourth vibration damping means 128d, and that it is in paired offset location with respect to the first such means 128a (analogous to the paired offset relation of the second and third such means 128b and 128c).

FIGS. 3 to 5 show a workpiece 116 on the support plate and in readiness for a program of measurements.

The portal of the coordinate-measuring machine is displaced by drive means 111, illustratively having friction-gear engagement to the actuating rod 9. The scale which measures portal displacement may be similar to the scale 126 which measures displacement of support plate 115; the portal-displacement scale may thus be understood to be applied along the upper edge of the right-side surface of the granite table 1, as seen in FIG. 5, being scanned by scale-reading means 102a carried by the foot formation 2a' of the portal column 2. In FIG. 5, the scale-reading means 102a is schematically shown as a small arrow.

Both drives, the drive motor 113 for support plate 115 and the drive means 111 for the portal are shown to be operated jointly by control means 103 which includes a microprocessor. The microprocessor contained in the control is, in this event, programmed such that the support plate and the portal are, for all movements during a measurement operation, driven simultaneously and in opposite directions with the velocities $V_{x1}$ and $V_{x2}$, such that:

$$m_p \times V_{x1} = -m_t \times V_{x2}$$

where $m_p$ is the mass to be moved by the portal drive 111 and $m_t$ is the mass of the support plate to be moved by its drive 113, it being noted that the average workpiece mass should be considered as a component of the support-plate mass $m_t$, so that inertial impulses of the two displaced parts are equal and opposite.

In this way, the invention provides assurance, on the one hand, that the machine table 1 will not be subjected to varying loads during measurement movements in the x direction of portal travel. Furthermore, such tilting moments as may occur in the acceleration phase of the involved drives, and with transfer to the machine table 1 as a reaction to displacing the masses of the portal and of the support plate, substantially balance out each other. Vibration dampers (128a–d), on which the machine table 1 rests are therefore not subjected to great stresses and can be developed as air dampers (e.g., dashpots). Furthermore, the duration of machine oscillation, if any, (i.e., when a measurement cannot be taken) is materially shortened, and greater portal speeds and acceleration values can be achieved—thus offering the opportunity to make more rapid measurements, i.e., to perform more measurement operations, per unit of time.

The measurement range of the machine of FIGS. 3 to 5 is increased in the same manner as that of the machine of FIGS. 1 and 2. This increase is to a value which is the sum of the travel paths of the portal 2 and the support plate 115 (15).

What is claimed is:

1. A coordinate-measuring machine having at least one upstanding column (2) guided for displacement on a table (1) for receiving a workpiece to be measured, and a device which increases the useful measurement volume of the coordinate-measuring machine, characterized by the fact that the device has a support plate (15; 115) which is displaceable on the table (1) and longitudinally alongside said column (2) into at least two defined positions, and means (16/17; 8/22; 126) for measuring the position of the support plate in each of said positions.

2. A coordinate-measuring machine according to claim 1, characterized by the fact that the support plate (15; 115) rests via air bearings (21) on the table (1) of the coordinate-measuring machine.

3. A coordinate-measuring machine according to claim 1, characterized by the fact that drive means (13; 113) is provided for successive displacement of the support plate (15; 115) into each of said positions.

4. A coordinate-measuring machine according to claim 3, characterized by the fact that the drive means (13; 113) is mounted within an upwardly open groove (12; 112) in the table (1) of the coordinate-measuring machine.

5. A coordinate-measuring machine according to claim 4, characterized by the fact that the support plate is guided in said groove (112).

6. A coordinate-measuring machine according to claim 1, characterized by the fact that several reference bodies (22a,b) which define measurement points are attached to the support plate (15) at locations which are measured by the coordinate-measuring machine in each of said positions of the support plate (15).

7. A coordinate-measuring machine according to claim 1, where the coordinate-measuring machine includes a computer, said position measuring means comprising several sensors (16a–c, 17a–c) mounted to the table (1) of the coordinate-measuring machine, said sensors being positioned to measure the location of the support plate (15) in each of said different positions, and means for supplying the signals of the sensors to said computer.

8. A coordinate-measuring machine according to claim 1, characterized by the fact that means (scale 126) are provided for continuously measuring displacement of the support plate (115).

9. A coordinate-measuring machine according to claim 1, characterized by the fact that the table (1) is stationary, that said column is one of two columns of a portal (2–4) which is longitudinally displaceable in a single direction of travel on the stationary table (1), and that the support plate (15; 115) is displaceable in the direction of travel of said portal.

10. A coordinate-measuring machine according to claim 9 characterized by the fact that the coordinate-measuring machine includes control means (103) connected to separate drives for displacement of the support plate (115) and for displacement of the portal (2), said control means coordinating displacement of the support plate and of the portal concurrently but in opposite directions.

11. A coordinate-measuring machine according to claim 10, characterized by the fact that said control means is operative to control the magnitude of the displacement velocities ($V_{x1}$, $V_{x2}$) such that the momentum of the moving portal (2) and the momentum of the support plate are substantially identical.

12. A coordinate-measuring machine according to claim 11, wherein mass involved in the momentum of the support plate includes the mass of the workpiece (116) which has been placed on the support plate.

13. A multiple-coordinate measuring machine of the portal type (a) wherein two transversely spaced upstanding columns of portal structure are guided for longitudinal displacement on the surface of a base table, (b) wherein the portal structure includes a bridge spanning the columns and a cross-slide transversely guided for displacement on the bridge, (c) wherein a probe-mounting spindle is guided for vertical displacement beneath the cross-slide, and (d) wherein the machine includes control means with a computer for recording the respective coordinates of each measured point on a workpiece, the improvement in which a workpiece-support plate is mounted to said table within the space between portal columns and is guided for longitudinal displacement independent of portal displacement, said control means being operative to make probe-contact measurements with one region of a given workpiece while said support plate is in a first longitudinal position and with another region on the same workpiece while said support plate is in a second longitudinal position, and means for measuring and entering into said computer positional data for said support plate when in each of said first and second longitudinal positions, said computer being programmed to enter into a single coordinate system the measured workpiece data for both said longitudinal positions, with coordinate-transposing correction appropriate to the longitudinal support-plate position at which the coordinate data of workpiece-contact measurements are taken.

14. A multi-coordinate measuring machine of the portal type (a) wherein two transversely spaced upstanding columns of portal structure are guided for longitudinal displacement on the surface of a base table, (b) wherein the portal structure includes a bridge spanning the columns and a cross-slide transversely guided for displacement on the bridge, (c) wherein a probe-mounting spindle is guided for vertical displacement beneath the cross-slide, and (d) wherein the machine includes control means with a computer for recording the respective coordinates of each measured point on a workpiece, the improvement in which a workpiece-support plate is mounted to said table within the space between portal columns and is guided for longitudinal displacement independent of portal displacement, said control means being operative to concurrently displace said portal and said support plate in opposite directions such that probe-contact measurements on one or more regions of the workpiece occur within and therefore short of the limits of displaceability of the support table and of the portal and for different longitudinally displaced locations of said portal and of said support plate, and means for measuring and entering into said computer positional data for said support plate and for said portal when in each of a plurality of relative longitudinally displaced positions thereof, said computer being programmed to enter into a single coordinate system the measured workpiece data for each of the relative positions of said plurality.

15. A multiple-coordinate measuring machine of the portal type (a) wherein two transversely spaced upstanding columns of portal structure are guided for longitudinal displacement on the surface of a base table, (b) wherein the portal structure includes a bridge spanning the columns and a cross-slide transversely guided for displacement on the bridge, (c) wherein a probe-mounting spindle is guided for vertical displacement beneath the cross-slide, and (d) wherein the machine includes control means with a computer for recording the respective coordinates of each measured point on a workpiece, the improvement in which a workpiece-support plate is mounted to said table within the space between portal columns and is guided for longitudinal displacement independent of portal displacement, said control means being operative to make probe-contact measurements with one region of a given workpiece while said support plate is in a first longitudinal position and with another region on the same workpiece while said support plate is in a second longitudinal position, and means for measuring and entering into said computer positional data for said support plate and for said portal when in each of said first and second longitudinal positions.

16. The improved multiple-coordinate measuring machine of claim 13 or claim 14 or claim 15, in which air bearings support said plate on said base table.

17. The improved multiple-coordinate measuring machine of claim 13 or claim 14 or claim 15, in which drive means connected to said control means is operative to displace said support plate into each of said positions.

18. The improved multiple-coordinate measuring machine of claim 13 or claim 14 or claim 15, in which drive means connected to said control means is operative to displace said support plate into each of said positions, said drive means being mounted within an upwardly open groove in said base table.

19. The improved multiple-coordinate measuring machine of claim 13 or claim 14 or claim 15, in which a plurality of reference bodies which define measurement points are carried by said support plate at locations which are measured by the machine in each of said positions of the support plate.

20. The improved multiple-coordinate measuring machine of claim 13 or claim 14 or claim 15, wherein a plurality of sensors mounted to said base table are positioned to measure the location of the support plate in each position, and means for supplying the signals of the sensors to said computer.

21. The improved multiple-coordinate measuring machine of claim 13 or claim 14 or claim 15, wherein scale means is provided for continuously measuring support-plate displacement.

22. The improved multiple-coordinate measuring machine of claim 13 or claim 14 or claim 15, in which drive means connected to said control means is operative to displace said support plate into each of said positions, said drive means being mounted within an upwardly open groove in said base table, said support plate being guided in said groove.

23. The improved multiple-coordinate measuring machine of claim 13 or claim 14 or claim 15, wherein said control means is connected to separate drives for longitudinal displacement of said support plate and for longitudinal displacement of said portal.

24. The improved multiple-coordinate measuring machine of claim 13 or claim 15, wherein said control means is connected to separate drives for concurrent but oppositely directed longitudinal displacement of said support plate and of said portal.

* * * * *

UNITED STATES PATENT AND TRADEMARK OFFICE
CERTIFICATE OF CORRECTION

PATENT NO. : 5,068,972
DATED : December 3, 1991
INVENTOR(S) : Klaus Herzog and Karl-Hermann Breyer It is certified that error appears in the above-identified patent and that said Letters Patent is hereby corrected as shown below:

On the cover sheet, the correct and complete name of assignee is:

Carl-Zeiss-Stiftung, Oberkochen, Fed. Rep. of Germany--.

Signed and Sealed this

Eleventh Day of May, 1993

Attest:

MICHAEL K. KIRK

Attesting Officer

Acting Commissioner of Patents and Trademarks